(12) United States Patent
Delaurier

(10) Patent No.: US 10,780,815 B2
(45) Date of Patent: Sep. 22, 2020

(54) PICKUP TRUCK LOADING DEVICE

(71) Applicant: Laurance Henry Delaurier, Leonard, MI (US)

(72) Inventor: Laurance Henry Delaurier, Leonard, MI (US)

(*) Notice: Subject to any disclaimer, the term of this patent is extended or adjusted under 35 U.S.C. 154(b) by 42 days.

(21) Appl. No.: 15/989,766

(22) Filed: May 25, 2018

(65) Prior Publication Data

US 2019/0283649 A1    Sep. 19, 2019

Related U.S. Application Data

(60) Provisional application No. 62/644,693, filed on Mar. 19, 2018.

(51) Int. Cl.
| | | |
|---|---|---|
| *B60P 3/07* | (2006.01) | |
| *B66D 1/60* | (2006.01) | |
| *B66D 1/28* | (2006.01) | |

(52) U.S. Cl.
CPC ............. *B60P 3/07* (2013.01); *B66D 1/28* (2013.01); *B66D 1/60* (2013.01)

(58) Field of Classification Search
CPC ............ B60P 3/07; B66D 1/28; B66D 1/60
See application file for complete search history.

(56) References Cited

U.S. PATENT DOCUMENTS

| | | |
|---|---|---|
| 2,433,598 A | 12/1947 | Chadwick et al. |
| 2,747,754 A | 5/1956 | Harrison et al. |
| 3,276,610 A | 10/1966 | Thatcher et al. |
| 3,768,678 A | 10/1973 | Youngers |
| 3,885,686 A | 5/1975 | Siebring |
| 4,058,229 A | 11/1977 | Triplett |
| 4,265,585 A | 5/1981 | Hawkins |
| 4,348,151 A | 9/1982 | Olson |
| 4,900,203 A | 2/1990 | Pope |
| 5,509,639 A | 4/1996 | Ellis |
| 5,511,929 A | 4/1996 | Loftus |
| 7,992,732 B2 | 8/2011 | Demiany et al. |
| 8,366,373 B2 | 2/2013 | Wood |
| 2007/0122259 A1* | 5/2007 | McGrath ............... B60P 3/07 414/538 |
| 2008/0164448 A1 | 7/2008 | Duvall |
| 2009/0115238 A1 | 5/2009 | Lane |
| 2013/0181023 A1 | 7/2013 | Shawanda |
| 2014/0061558 A1 | 3/2014 | Einhorn |
| 2017/0253469 A1* | 9/2017 | Hall ...................... B66D 1/28 |
| 2018/0022174 A1* | 1/2018 | Stojkovic ............... B66D 1/28 414/506 |

* cited by examiner

*Primary Examiner* — Saul Rodriguez
*Assistant Examiner* — Ashley K Romano
(74) *Attorney, Agent, or Firm* — Dunlap Bennett & Ludwig, PLLC

(57) ABSTRACT

A pickup truck loading device. The pickup truck loading device includes an elongated rod having a first end, a second end, and a central portion. A winch mount is disposed at the central portion of the elongated rod. A first end bracket and a second end bracket each include a channel and are each configured to mount to an upper rim of opposing sides of a truck bed. The first end of the elongated rod is slidably engaged within the channel of the first end bracket and the second end of the elongated rod is slidably engaged within the channel of the second end bracket.

4 Claims, 4 Drawing Sheets

PICKUP TRUCK LOADING DEVICE

CROSS-REFERENCE TO RELATED APPLICATION

This application claims the benefit of priority of U.S. provisional application No. 62/644,693, filed Mar. 19, 2018, the contents of which are herein incorporated by reference.

BACKGROUND OF THE INVENTION

The present invention relates to loading pickup truck beds and, more particularly, to a pickup truck loading assembly that is winch enabled and is used to draw and lower heavy objects into a pickup truck bed safely.

Loading heavy objects from ground level up and into a pickup truck bed can be difficult and labor intensive. Lifting heavy objects involves physical strain and risk of injury. When loading ATV's, garden tractors, generators, appliances and other objects requires the mover to drive or walk up a set of ramps to load the object(s) into the truck bed. Shifting or breaking of the ramps has caused personal injury. Items such as ATV's, garden tractors, generators, refrigerators and appliances are amongst the items with the greatest risk to personal safety.

As can be seen, there is a need for a pickup truck loading device that aids in loading large items into a pickup truck bed.

SUMMARY OF THE INVENTION

In one aspect of the present invention, a pickup truck loading device comprises: an elongated rod having a first end, a second end, and a central portion disposed therebetween; a winch mount disposed at the central portion of the elongated rod; a first end bracket and a second end bracket each comprising a channel and each configured to mount to an upper rim of opposing sides of a truck bed, wherein the first end of the elongated rod is slidably engaged within the channel of the first end bracket, and the second end of the elongated rod is slidably engaged within the channel of the second end bracket.

In another aspect of the present invention, a pickup truck loading device comprises: an elongated rod having a first end, a second end, and a central portion disposed therebetween; a winch coupled to the central portion of the elongated rod; a first end bracket and a second end bracket each configured to mount to an upper rim of opposing sides of a truck bed, wherein the first end of the elongated rod is coupled to the first end bracket, and the second end of the elongated rod is coupled to the second end bracket.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention is a pickup truck loading assembly that is winch enabled and is used to draw heavy objects into a pickup truck bed safely and without the need of a helper. The present invention may include elements made of metal, such as aircraft grade aluminum or steel, and utilizes an attached winch. The present invention allows the operator to stand at ground level, away from the truck, and operate the winch to pull heavy objects up the ramps and onto the truck bed to be secured and transported. The present invention may also be removable for the truck. For example, if a truck user is leasing the vehicle, they can remove and transfer the assembly without any holes having been drilled into the bed rail.

Figure 1:
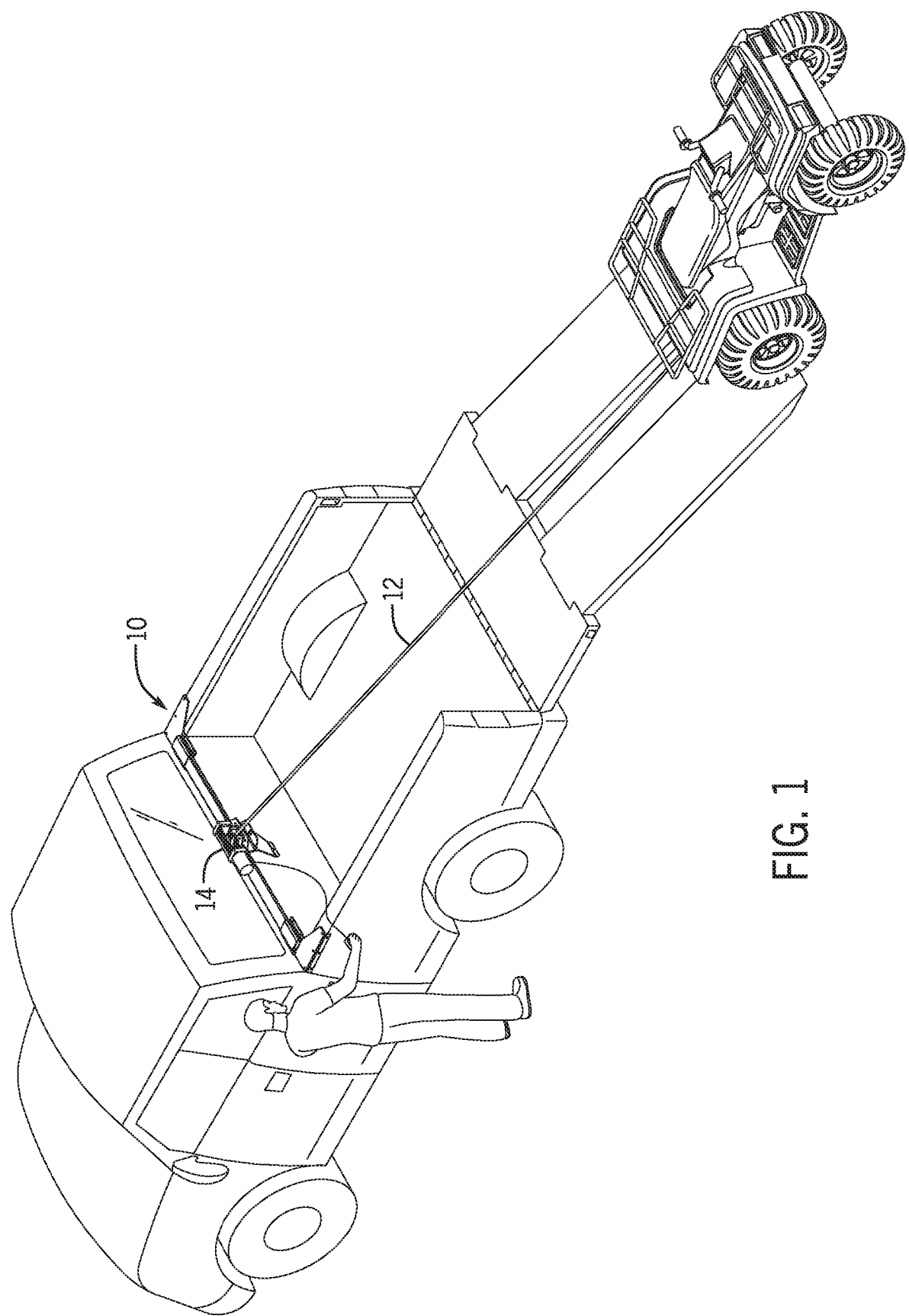
FIG. 1 is a perspective view of an embodiment of the present invention in use.
Figure 2:
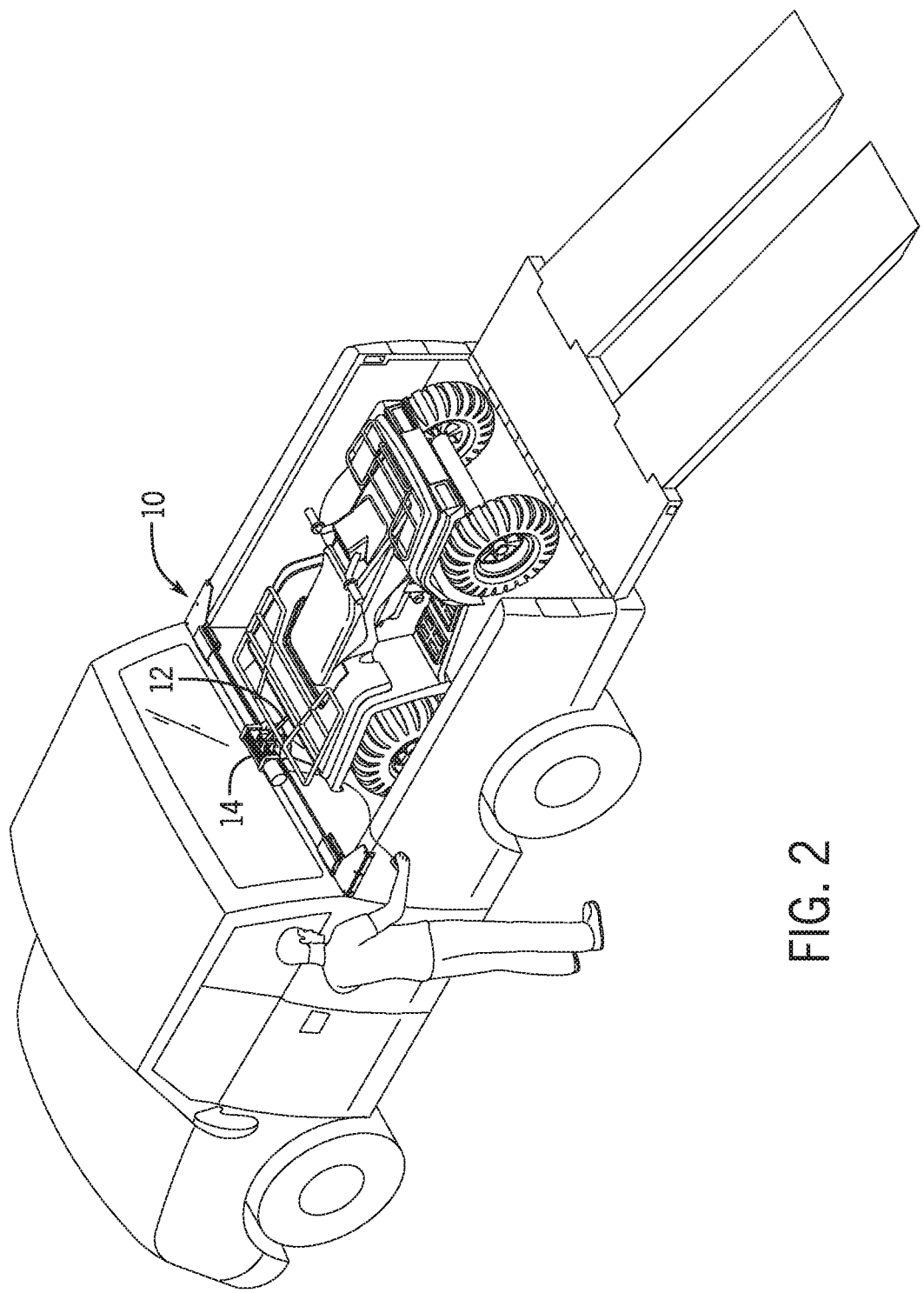
FIG. 2 is a perspective view of an embodiment of the present invention in use.
Figure 3:
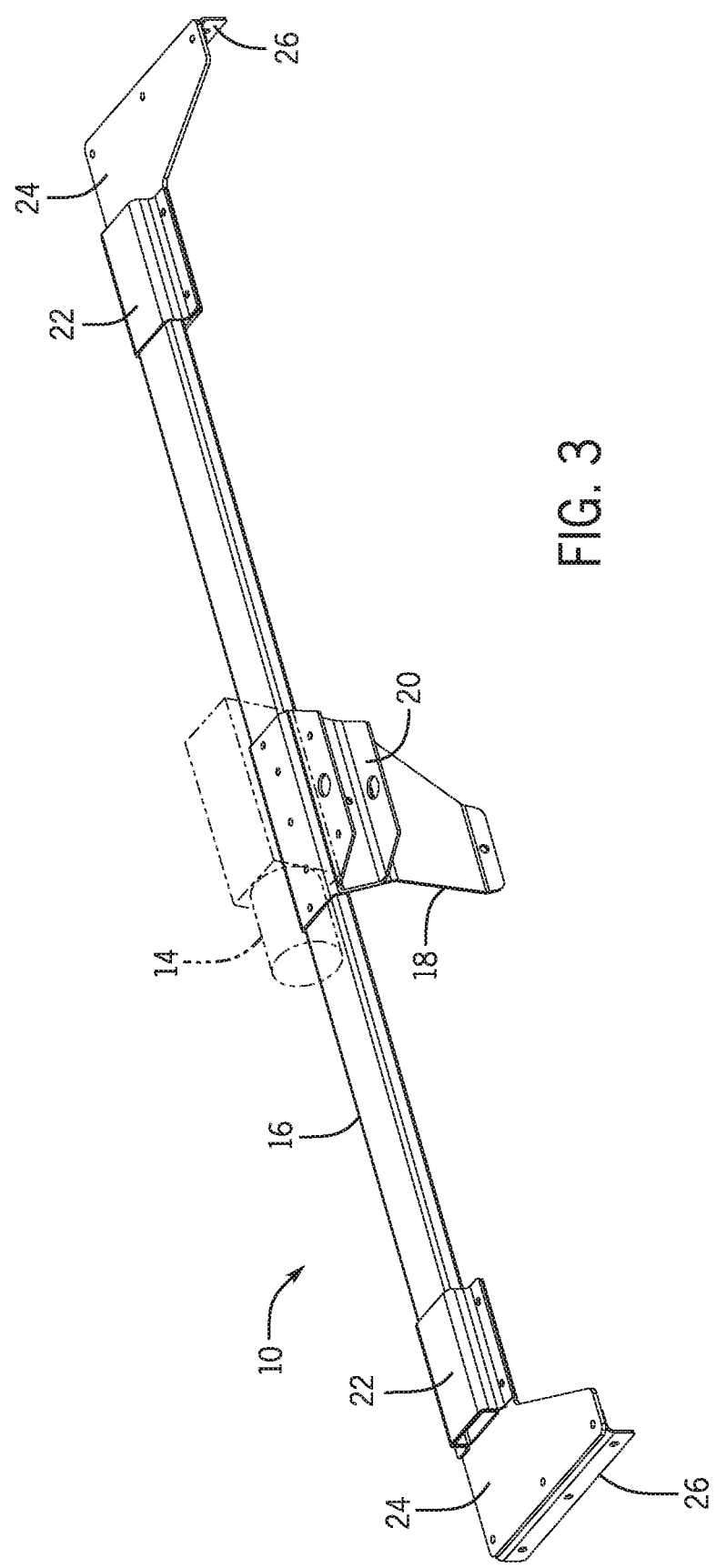
FIG. 3 is a perspective view of an embodiment of the present invention.
Figure 4:
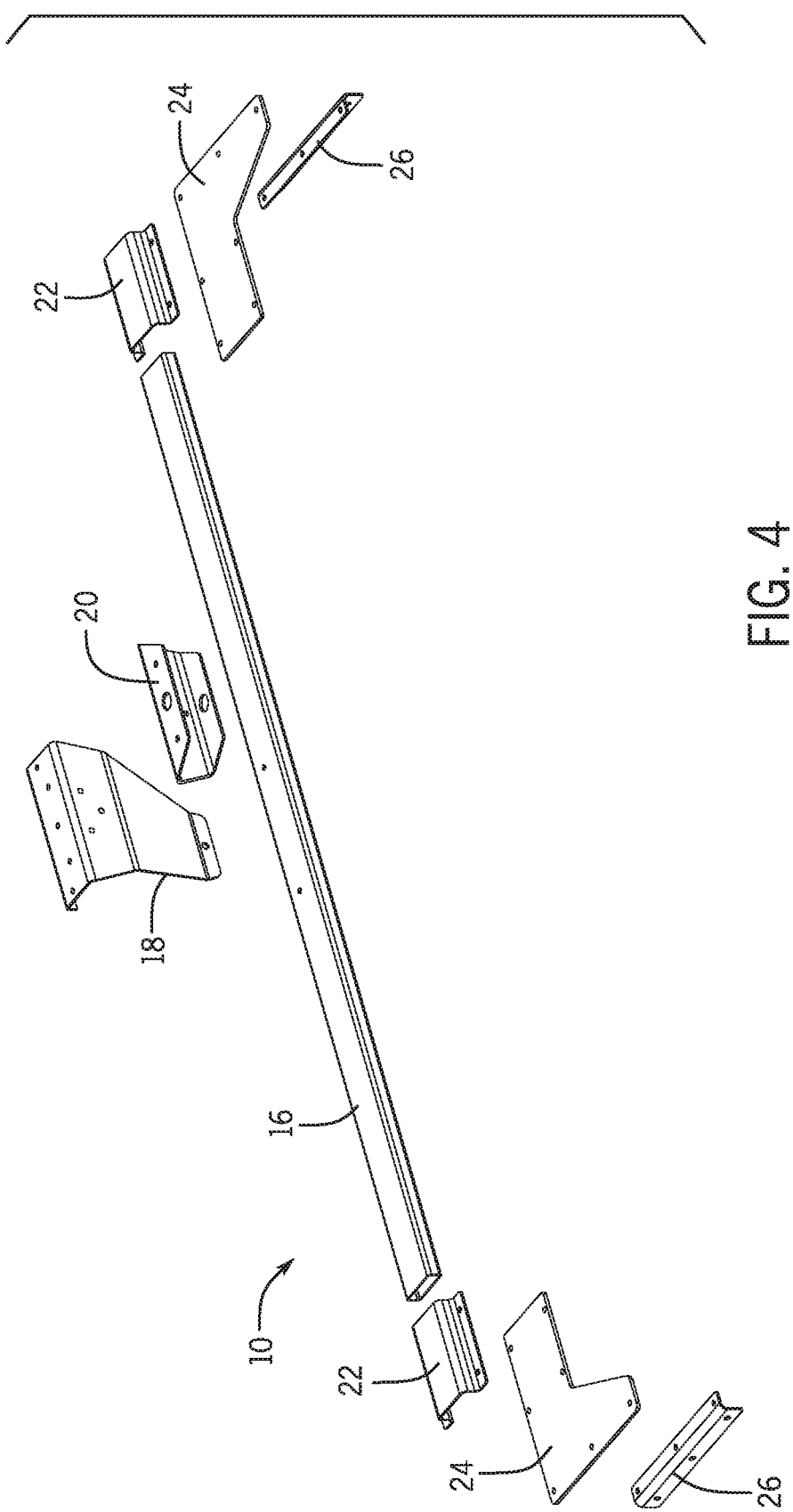
FIG. 4 is an exploded perspective view of an embodiment of the present invention.

Referring to FIGS. 1 through 4, the present invention includes a pickup truck loading device 10. The pickup truck loading device 10 includes an elongated rod 16 having a first end, a second end, and a central portion. A winch mount 18, 20 is disposed at the central portion of the elongated rod 16. A first end bracket 22, 24 and a second end bracket 22, 24 each include a channel and are each configured to mount to an upper rim of opposing sides of a truck bed. The first end of the elongated rod 16 is slidably engaged within the channel of the first end bracket 22, 24 and the second end of the elongated rod 16 is slidably engaged within the channel of the second end bracket 22, 24. The sliding engagements allow the present invention to adjust to different sized truck beds.

In certain embodiments, the first end bracket 22, 24 and the second end bracket 22, 24 each include a plate 22 and a channel bracket 24. The plate 22 has an upper surface and a lower surface. The channel bracket 24 includes side flanges, risers, and a top member connecting the risers together. The side flanges are coupled to the upper surface of the plate 22. The channel is defined in between the upper surface of the plate 22, the risers, and the top member. The present invention may further include a first angle bracket 26 and a second angle bracket 26 each including a first member and a second member perpendicular to one another. The first member is coupled to the plate 22 and the second member is coupled to the truck bed, thereby coupling the first end bracket 22, 24 and the second end bracket 22, 24 to the truck bed.

The winch mount 18, 20 includes a support bracket 18 and a winch connector 20. The support bracket 18 includes an upper plate coupled to the central portion of the elongated rod 16 and a lower plate extending downward from the upper plate and angling back towards the upper plate. The winch connector 20 is coupled to the upper plate of the support bracket 18. The winch 14 is coupled to the winch connector 20. When in use, the cable 12 of the winch 14 is unwound and connected to the object to be loaded onto the truck bed. The cable 12 is then wound back onto the winch 14, thereby pulling the object onto the truck bed. The lower plate of the support bracket 18 distributes the pressure of pulling the object against the back wall of the truck bed, preventing the winch 14 from ripping off.

Each of the components when fastened together, work to form an assembly that spans the width of a pickup truck bed. With a winch mounted in the center of the assembly, the user can release the winch rope or cable to freewheel the rope or cable and attach it to the object desired to be pulled up and into the truck bed. The user then provides a power source to the winch. Using a set of ramps, the user then stands at ground level, away from the truck, then operates the winch from either a remote control or hand held remote to control the winch pulling force using either the "In" or "Out" direction as desired which in turn pulls or lowers the object up the ramps and into the pickup truck bed, thus enabling the object(s) to be transported.

It should be understood, of course, that the foregoing relates to exemplary embodiments of the invention and that modifications may be made without departing from the spirit and scope of the invention as set forth in the following claims.

What is claimed is:

1. A pickup truck loading device comprising:
an elongated rod having a first end, a second end, and a central portion disposed therebetween;
a winch mount comprising a support bracket having an upper plate coupled to an upper surface of the elongated rod at the central portion and a lower plate extending downward from the upper plate and angling back towards the upper plate beneath the elongated rod;
a first end bracket and a second end bracket each comprising a channel and each configured to mount to an upper rim of opposing sides of a truck bed, wherein
the first end of the elongated rod is slidably engaged within the channel of the first end bracket,
the second end of the elongated rod is slidably engaged within the channel of the second end bracket, wherein the first end bracket and the second end bracket each comprise a plate and a channel bracket, wherein the plate is configured to secure to the upper rim of the truck bed and the channel bracket is coupled to an upper surface of the plate, wherein the channel is defined in between the plate and the channel bracket; and
a first angle bracket comprising a first member and a second member perpendicular to one another and configured to couple the first end bracket to the upper rim of the truck bed and a second angle bracket comprising a first member and a second member perpendicular to one another and configured to couple the second end bracket to the upper rim of the truck bed.

2. The pickup truck loading device of claim 1, wherein the winch mount further comprises a winch connector bracket coupled to the support bracket.

3. The pickup truck loading device of claim 2, further comprising a winch coupled to the winch connector bracket.

4. The pickup truck loading device of claim 1, further comprising a winch coupled to the winch mount.

* * * * *